Figure 1:
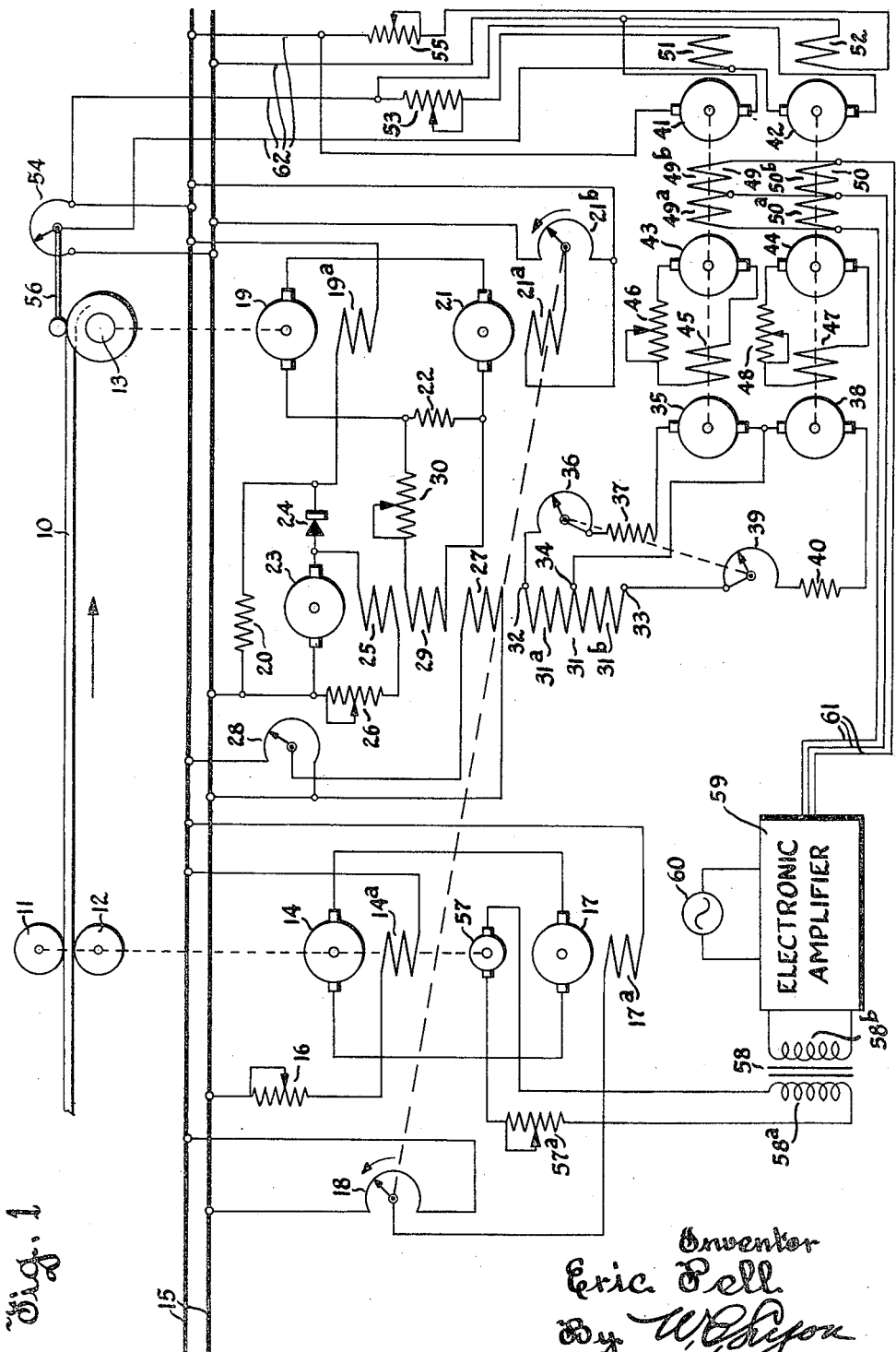

Oct. 9, 1956  E. PELL  2,765,989
CONTROL SYSTEM FOR ELECTRIC MOTORS
Filed July 27, 1953  2 Sheets-Sheet 1

Inventor
Eric Pell
By W.C. Lyon
Attorney

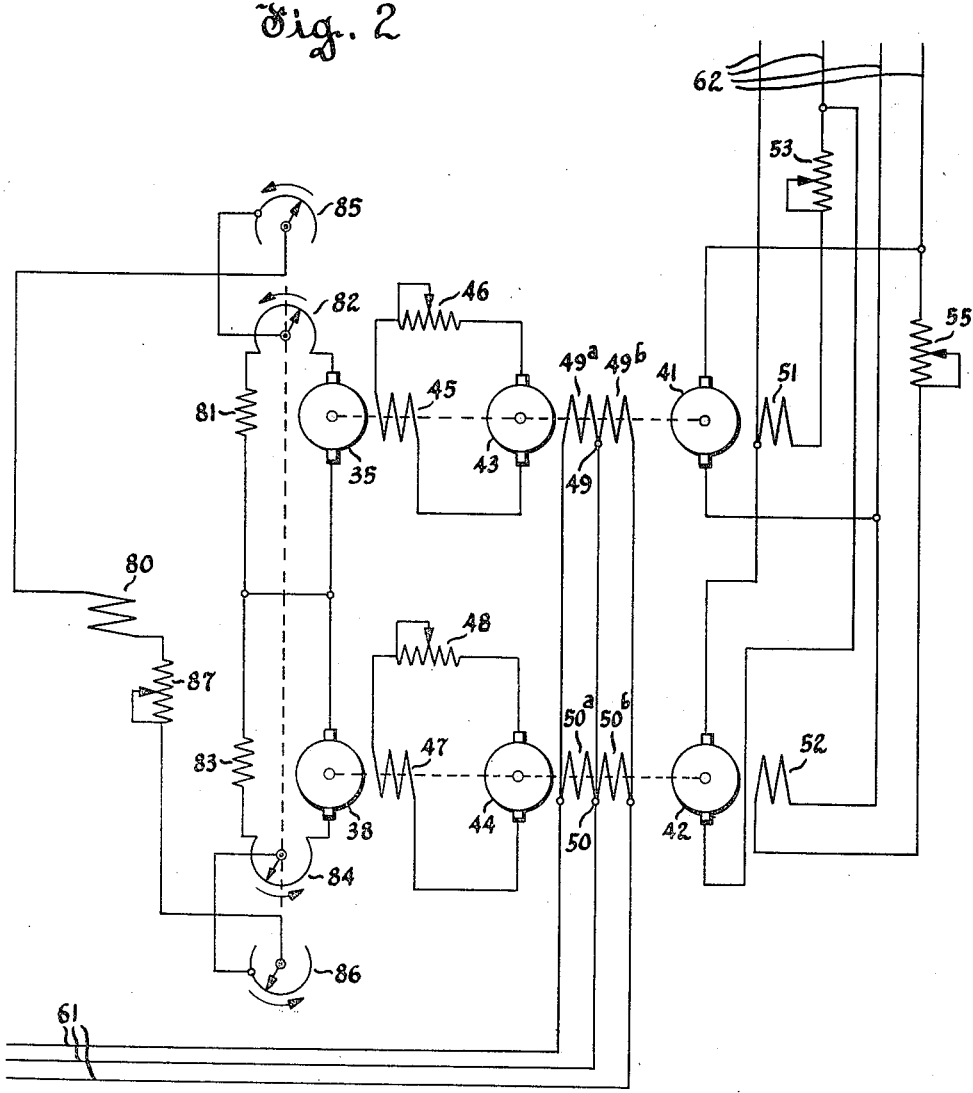

United States Patent Office 2,765,989
Patented Oct. 9, 1956

2,765,989

CONTROL SYSTEM FOR ELECTRIC MOTORS

Eric Pell, Shorewood, Wis., assignor to Cutler-Hammer, Inc., Milwaukee, Wis., a corporation of Delaware Application July 27, 1953, Serial No. 370,287

13 Claims. (Cl. 242—75)

This invention relates to control systems for electric motors, and more particularly to tension control systems for reel motors.

In the processing of sheet material, such as in the reducing and tempering of a long strip of sheet steel the material is passed through a mill and is coiled in a roll on a reel driven by an electric motor. During such coiling operation, the strip material is brought from the processing operation by mill work rolls which also are driven by an electric motor. The speed of the mill work roll motor determines the linear speed of the strip material. To insure uniformity of quality throughout the length of material, it is required that the material be coiled under constant or substantially constant tension. To maintain such constant tension during periods of acceleration and deceleration requires special equipment for compensation of the inertia of the moving parts. Thus the winding reel motor during periods of acceleration must supply additional torque to bring the moving parts up to the new speed while maintaining the proper tension of the strip material. Conversely, during periods of deceleration, the winding reel motor must supply less torque, which when added to the torque effected by the inertia of the moving parts trying to maintain their higher speed, will provide the proper substantially constant tension in the strip material.

It is, therefore, a primary object of the present invention to provide a reliable and accurate control system whereby inertia of the moving parts may be compensated for to afford reeling of strip material under constant tension during periods of acceleration and deceleration.

Another object is to adapt a known type of regulator to a reel motor to effect compensation for the inertia of the various moving parts during a change in rotational velocity in the coiling reel.

Another more specific object is to provide a control system for determining the proper inertia compensation of all of the moving parts to provide the aforementioned corrective action.

Another specific object is to provide a system for ascertaining the rate of acceleration or deceleration and the change in diameter or mass of the reeling coil and to combine the same to effect compensation for the inertia of the moving parts.

Another even more specific object is to determine the amount of compensation required for the inertia of the moving parts, such as motor and reel machinery, and to determine the amount of compensation required for the inertia of the variables, such as the varying coil, so that they may be later combined and translated into terms of motor current to effect the required compensation.

The novel features which I consider characteristic of my invention are set forth with particularity in the appended claims. The invention itself, however, both as to its organization and its method of operation, together with additional objects and advantages thereof, will best be understood from the following description of specific embodiments, when read in connection with the accompanying drawings, in which:

Fig. 1 is a diagrammatic showing of a reeling mechanism and control system therefor, and Fig. 2 is a diagrammatic showing of a modified form of part of the control system shown in Fig. 1.

Referring to Fig. 1, it shows a length of material 10, such as a strip of sheet steel, passing through mill work rolls 11 and 12 in the direction of the arrow and being coiled on a wind-up reel 13.

The mill work rolls 11 and 12 are driven by a direct current motor 14 having a separately excited field winding 14a. Field winding 14a is connected across opposite sides of a source of constant direct current voltage 15 in series with an adjustable resistor 16. Power is supplied to the armature of motor 14 by an adjustable voltage generator 17, the armature of which is connected in a closed loop with the armature of motor 14. Generator 17 is provided with a separately excited field winding 17a which is connected at one end to one side of source 15 and at its other end to an adjustable slide wire of a potentiometer rheostat 18 which is connected across opposite sides of source 15. Generator 17 is preferably driven at substantially constant speed by any suitable driving means.

The wind-up reel 13 is driven by a direct current motor 19 having a separately excited field winding 19a connected across source 15 in series with a resistor 20. Power is supplied to the armature of motor 19 by an adjustable voltage generator 21, the armature of which is connected in a closed loop with the armature of motor 19 in series with a resistor 22. Generator 21 is provided with a separately excited field winding 21a which at one end is connected to one side of source 15 and at its other end to an adjustable slide wire of a potentiometer rheostat 21b, which is connected across opposite sides of source 15. The slide wire of rheostat 21b is preferably mechanically coupled with the slide wire of rheostat 18, so that movement of one will effect corresponding movement of the other. Generator 21 is preferably driven at substantially constant speed by any suitable driving means.

A bucking exciter 23 in series with a rectifier 24 is connected across resistor 20 and is driven at substantially constant speed by any suitable driving means. As will be hereinafter more fully explained, exciter 23 constitutes a current regulator for motor 19, and according to its output acts to vary the excitation of the field winding 19a of the motor by counter-acting the excitation afforded by the source of supply 15. When the output of the exciter 23 is high, its bucking action is high, and as a result the excitation of field winding 19a of motor 19 is low. The bucking action of exciter 23 reaches a maximum value, which because of rectifier 24 cannot be exceeded, when its output equals the voltage across the resistor 20. Conversely, when the output of exciter 23 is low its bucking action will be low and the excitation of field winding 19a of motor 19 will be high. When exciter 23 is operating at high output voltage, reversal of current through the exciter is prevented by rectifier 24 to insure against weakening winding 19a below a certain predetermined minimum value.

Exciter 23 is provided with a self-excited field winding 25 connected across its terminals in series with an adjustable resistor 26. Winding 25 supplies the necessary ampere turns for maintaining the field of the exciter at any point within its regulating range. Further, exciter 23 is provided with a reference field winding 27, which at one end is connected to one side of the supply source 15 and at its other end to a slide wire of a potentiometer rheostat 28 which is connected across opposite sides of supply source 15. Exciter 23 is also provided with a signal field winding 29 which is connected across the resistor 22 in series with an adjustable resistor 30.

Exciter 23, as thus far described under steady state conditions, i. e., material 10 advancing from mill work rolls 11 and 12 at constant linear speed, functions in a well-known manner to afford constant horsepower output of motor 19, so that the material 10 will be coiled on reel 13 under constant tension. According to the adjustment of rheostat 28, reference field winding 27 will afford a fixed number of ampere turns which determine the maximum output of exciter 23. The signal field winding 29 provides an equal number of ampere turns for counter-acting the ampere turns of the reference field winding 27. Assuming steady state conditions, when reel 13 is near empty condition at the start of reeling, the output of exciter 23 is maximum, and affords maximum bucking action. Consequently, excitation of field winding $19^a$ of motor 19 is at a minimum, and the motor rotates at high speed. As the diameter of the coil of material 10 on reel 13 increases, the motor 19 tends to decrease in speed with the result that current flow through the armature of the motor tends to increase. As the armature current increases the voltage drop across resistor 22 increases correspondingly, and as a result, the excitation of signal field winding 29 is increased to afford some small marginal increase in its number of ampere turns for counter-acting the ampere turns of the reference field winding 27. As a result, the output of exciter 23 is reduced, and the excitation of the field winding $19^a$ of motor 19 is correspondingly increased. Increased excitation of winding $19^a$ increases the counter voltage in the armature of motor 19 so that the armature current is again reduced to the constant value determined by the setting of the rheostat 28.

At the start of reeling of material 10, following threading thereof through the mill work rolls 11 and 12, and anchoring of the leading end on roll 13, the motor 14 is accelerated from rest to some preset speed, which is determined by appropriate adjustment of the adjustable resistor 16. In order to wind the material 10 on reel 13 at constant tension during such accelerating period of motor 14, it is necessary to increase the torque of motor 19 by an amount necessary to overcome the inertia of reel 13 and the armature of motor 19. This is accomplished in the present control system by modifying the output of exciter 23 in relation to the rate of change of speed of motor 14 and the change in diameter of the coil of material on reel 13. The preferred additional means utilized in the present control system for effecting this type of control will now be described.

Exciter 23, in addition to its aforedescribed field windings, is provided with a field winding 31 which may be termed an inertia compensating winding. Winding 31 is provided with end taps 32 and 33 and an intermediate tap 34. End tap 32 is connected to the armature of a generator 35 in series relation with a rheostat 36 and a resistor 37. End tap 33 of winding 31 is connected to the armature of a generator 38 in series relation with a rheostat 39 and a resistor 40. The armatures of generators 35 and 38 are connected to each other and to the center tap 34 of winding 31, as shown in Fig. 1. The slide wire of rheostat 36 is preferably mechanically coupled with the slide wire of rheostat 39, so that movement of one will affect corresponding movement of the other. Generators 35 and 38 are driven by motors 41 and 42 respectively, thus forming independent motor-generator sets. Each of said generators 35 and 38 has a field winding 45 and 47 respectively. Field winding 45 is connected in a closed loop with an exciter 43 in series with an adjustable resistor 46. Field winding 47 of generator 38 is connected in a closed loop with an exciter 44 in series with an adjustable resistor 48. Each of said exciters 43 and 44 has a field winding 49 and 50 respectively and an armature which is mechanically coupled to motors 41 and 42 respectively.

The armature of motor 41 is connected across the direct current source 15. Motor 41 is provided with a separately excited field winding 51 connected at one end to one side of source 15 in series with an adjustable resistor 53, and at its other end to an adjustable slide wire of a potentiometer rheostat 54 which is connected across opposite sides of source 15. The armature of motor 42 is connected at one end to one side of source 15 and at its other end to the adjustable slide wire of potentiometer rheostat 54. Said motor 42 is provided with a field winding 52 which is connected across source 15 in series with an adjustable resistor 55.

Potentiometer rheostat 54 has its adjustable slide wire connected to a follower 56 which engages the strip material coiled on reel 13. It is thus seen that the adjustable slide wire of rheostat 54 will move in a direct relation to changes in coil radius or diameter thereby providing an electrical potential proportional to coil diameter. Potentiometer rheostat 54 and follower 56 are only illustrative of means for providing a potential which is proportional to coil diameter; whereas it is realized that many devices and systems are available for providing such effect.

A direct current tachometer generator 57, driven by the shaft of motor 14, is connected at its terminals to opposite sides of a primary winding $58^a$ of an impulse transformer 58 in series with an adjustable resistor $57^a$. Transformer 58 also has a secondary winding $58^b$ connected to the input side of an electronic amplifier 59. Power for amplifier 59 is provided by an alternating current source 60. The output of amplifier 59 is fed through conductors 61 to the exciter field windings 49 and 50 connected in electrical parallel relation.

The output voltage of tachometer generator 57 varies directly with the speed of motor 14 and consequently the current in primary winding $58^a$ of transformer 58 also will vary according to the speed of motor 14. During acceleration of motor 14 the flux of winding $58^a$ will, because of a substantial air gap in the magnetic path of the transformer, vary according to the change in speed of motor 14 and consequently the voltage induced in the secondary winding $58^b$ will, for a given rate of change of speed, be a certain constant value. In other words, the voltage induced in the secondary winding $58^b$ is proportional to the rate of change of speed motor 14.

It will be appreciated that if transformed 58 is to be kept to a practical size, its output current and voltage will be relatively low. In order to make the low output signal derived from transformed 58 effective for controlling the excitation of field windings 49 and 50 of exciters 43 and 44 respectively, I prefer to interpose an amplified 59 between the secondary winding $58^b$ of the transformer and the aforedescribed field windings 49 and 50. Although any means for providing the proper amplification can be used, I prefer to employ the electronic amplifier described in Patent No. 2,697,807, for Control System for Electric Motor, issued December 21, 1954. The details of construction and operation are believed to be adequately described in Patent No. 2,697,807.

When the voltages applied to portions $49^a$ and $49^b$ of winding 49 are equal in magnitude the effective ampere turns afforded by winding 49 will be zero and as a result, the output voltage of exciter 43 will not be influenced by said winding 49 and thus will be at substantially zero value. The same being true for winding 50 and exciter 44, under such conditions, exciter 23 controls motor 19 as hereinbefore described, under steady state conditions. During acceleration or deceleration of motor 14, as starting or stopping of the reeling operation, the voltage induced in winding $58^b$ of impulse transformed 58 varies according to the acceleration of motor 14. This induces a stronger current flow through one portion ($49^a$ or $49^b$) of winding 49, thus producing a resultant amper turns effect on the armature of exciter 43. The directional effect of such ampere turns is dependent upon whether motor 14 is accelerating or decelerating. The same effect occurs in winding 50 and exciter 44 thus augmenting the field strength of windings 45 and 47 as produced by the rotation of motors 41 and 42. It is thus readily realized that the excitation of windings 45 and 47 is dependent upon the speed of motors 41 and 42 and upon the rate of acceleration or deceleration of motor 14.

The potentiometer rheostat 54 is connected across the source 15 while its adjustable slide wire is mechanically connected to a follower 56, thus effecting a potential, between the slide wire and one end of the rheostat, proportional to the diameter of the coil on reel 13. Such a potential is necessary since the inertia of the coil changes with changes in coil diameter. The potential, which varies with variations in coil diameter is impressed across field winding 51 of motor 41 and across the armature of motor 42. It is thus seen that as the diameter of the coil increases the energization of winding 51 will increase accordingly thereby causing a corresponding decrease in the speed of motor 41. The rotational speed of motor 41, and likewise the speed of exciter 43 and generator 35, will be inversely proportional to the coil diameter. Motor 42, on the other hand, has its armature connected to the potential which varies in accordance with variation in coil diameter. This effects rotational speed of motor 42 and exciter 44 and generator 38 in direct proportion to the coil diameter.

Since the output of generator 35 is dependent upon the rotational movement of its armature and upon the field strength of winding 45, the output realized across portion $31^a$ of winding 31 will be inversely proportional to the square of the diameter of the coil since the armature rotation and the field strength of winding 45 are each proportional to the speed of motor 41.

The output of generator 38 as realized across portion $31^b$ of winding 31 is proportional to the square of the diameter of the coil on reel 13. This results since the speed of generator 38 and the field strength of winding 47 are each proportional to the speed of motor 42 or to the diameter of the coil.

The output of amplifier 59 is impressed across each of windings 49 and 50 thus causing the output of exciters 43 and 44 to vary in accordance with such amplifier output, as above explained. The output of each of windings 45 and 47 of generators 35 and 38 respectively thus varies in accordance with the rate of acceleration or deceleration of motor 14.

The motor torque ($T_f$) required to accelerate a fixed mass ($WR^2$) at an angular rate of acceleration $d\omega/dt$ is $T_f = K_1 WR^2 d\omega/dt$, where $K_1$ is a proportionality constant. Also, the motor torque produced by a current $I_f$ and a motor field strength $\phi$ is $T_f = K_2 I_f \phi$, where $K_2$ is a proportionality constant. But, with the tension regulator 23 regulating to constant motor horsepower and current with build up of the reel, the motor field strength $\phi$ is proportional to coil radius, (R), or $T_f = K_3 I_f R$, where $K_3$ is a proportionality constant.

$$\therefore \text{Motor current } I_f =$$

$$K_4 \frac{WR_f^2 d\omega}{R\ dt} = K_5 \frac{WR_f^2}{R} \frac{dv}{dt}$$

where $$\frac{dv}{dt}$$

is the rate of the linear acceleration of the strip and $K_4$ and $K_5$ are proportionality constants.

The input to the portion $31^a$ of the control field of the regulating exciter 23 is proportional to the above expression and thus will effect a recalibration of the regulator to permit a corresponding increase in the motor current for compensation of the fixed inertia of motor and reel machinery.

The motor torque $T_c$ required to accelerate the mass of a solid coil of radius R is $$T_c = K_s WR_c^2 \frac{d\omega}{dt} = K_6 \frac{R^4}{R} \frac{dv}{dt}$$

where $K_5$ and $K_6$ are proportionality constants. Also $T_c = K_2 I_c \phi = K_3 I_c R$, as shown above.

$$\therefore \text{Motor current } I_c = K_7 \frac{R^4}{R^2} \frac{dv}{dt} = K_7 R^2 \frac{dv}{dt}$$

where $K_7$ is a proportionality constant.

The input to the portion $31^b$ of the control field of the regulating exciter 23 is proportional to the above expression and thus will effect a recalibration of the regulator to permit a corresponding increase in the motor current for compensation of the variable inertia of the coil with increase in diameter.

That total effect on the regulating exciter and reel motor current is thus to compensate for the proper $WR^2$ value of reel machinery and coil with varying coil diameter and rate of acceleration.

In dividing the inertia of the fixed parts from the inertia of the coil, it becomes necessary, for the achievement of a continuous function of the coil inertia compensation, to deduct from the inertia of the fixed parts, the inertia of a solid disc of a diameter equal to that of the empty reel and of a thickness equal to the width of the strip. This deduction is effected by an appropriate setting of the adjustable slide wire of potentiometer rheostat 36. Rheostats 36 and 39 are adjustable to compensate for changes in the width of the strip material 10 and are thus manually readjusted when strip material of a different width is wound on reel 13.

A second embodiment of the invention is shown in Fig. 2. In an effort to avoid needless duplication in Fig. 2 of many of the components shown in Fig. 1, the modified form of the invention has been shown as being connectable to the tension controller by means of conductors 61 and 62, and a single field winding 80 of exciter 23. Thus the arrangement shown in Fig. 2 is a modification for replacing the inertia calculator of Fig. 1 which utilizes an inertia compensating winding 31 having an intermediate tap 34. Fig. 2 shows a system whereby the output of generators 35 and 38 are impressed across a single field winding 80 of exciter 23. The motors, exciters and generators are identical in construction and in performance with the similar units of the first embodiment. In the second embodiment of Fig. 2, however, the armature of generator 35 is connected in a closed loop with a resistor 81 in series with a potentiometer rheostat 82 having an adjustable slide wire. The armature of generator 38 is connected in a closed loop with a resistor 83 in series with a potentiometer rheostat 84 having an adjustable slide wire. Said armatures of generators 35 and 38 are connected together as clearly shown in Fig. 2. The adjustable slide wire of potentiometer rheostat 82 is connected to one side of field winding 80 of exciter 23 in series with an adjustable resistor 85. The slide wire of rheostat 84 is connected to the other side of said field winding 80 in series relation with adjustable resistors 86 and 87. I prefer to employ rheostats as adjustable resistors 85 and 86 so that the adjustable slide wires of said rheostats can be mechanically coupled with the slide wires of rheostats 82 and 84 so that movement of any of the slide wires will affect corresponding movement of all the other slide wires. Rheostats 82 and 85 are of the type disclosed in my Patent No. 2,634,386 for Control System for Electric Motors, issued April 7, 1953, and assigned to the assignee of the present application. As fully explained in such Patent No. 2,634,386, the resistance elements of rheostats 82 and 85 are complementally formed so that for any positioning of the adjusting slide wires the equivalent resistance of the rheostat set (rheostats 82 and 85) in the circuit will be constant. Reference should be made to the aforementioned application for a more complete understanding of the design and electrical characteristics of such rheostats. Rheostats 84 and 86 are also of the type disclosed in Patent No. 2,634,386 so that simultaneous adjustment of rheostats 85, 82, 84 and 86 will not effect the total resistance of the circuit. The adjustability of rheostats 85, 82, 84 and 86 is essential to effect a change in the output of generators 35 and 38 for changes in the width of the strip material 10. Said rheostats thus perform the same functions as do mechanically coupled rheostats 36 and 39 of the first embodiment shown in Fig. 1.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. In a tension controller for a material winding system comprising, a motor driving a work roll and a motor driving a winding reel, the combination with interconnected speed adjusting means for the motors driving said work roll and said reel to effect cordinated speed adjustment of said motors and control means for said reel motor acting to maintain the material under constant tension during constant strip speed winding, of means providing a potential which varies in accordance with the rate of change of strip speed, means providing a potential which varies in accordance with variations in reel diameter, and inertia compensating means for said control means including a generator having an armature and a field winding, means responsive to the last mentioned potential drive said armature at a rate inverse with respect to variations in reel diameter and means for energizing the field winding in accordance with variation in the product of said two potentials.

2. In a tension controller for a material winding system comprising, a motor driving a work roll and a motor driving a winding reel, the combination with interconnected speed adjusting means for the motors driving said work roll and said reel to effect coordinated speed adjustment of said motors and control means for said reel motor acting to maintain the material under constant tension during constant strip speed operation, of means providing a potential which varies in accordance with the rate of change of strip speed, means providing a potential which varies in accordance with the variations in reel diameter, and inertia compensating means for said control means including a generator having an armature and a field winding, means responsive to the last mentioned potential to drive said armature at a rate in accordance with variations in reel diameter and means for energizing said field winding in accordance with variations in the product of said two potentials.

3. In a tension controller for a material winding system comprising, a motor driving a work roll and a motor driving a winding reel, the combination with interconnected speed adjusting means for the motors driving said work roll and said reel to effect coordinated speed adjustment of said motors and control means for said reel motor acting to maintain the material under constant tension during constant strip speed winding, of means providing a potential which varies in accordance with the rate of change of strip speed, means providing a potential which varies in accordance with variations in reel diameter, and inertia compensating means for said control means and comprising first and second generators, each of which has an armature and a field winding, means responsive to the last mentioned potential for driving the armature of said first generator at a rate inverse with respect to variations in reel diameter, means for energizing the field winding of said first generator with the product of the first mentioned potential and the inverse function of said last mentioned potential, means responsive to said last mentioned potential to drive the armature of said second generator at a rate in accordance with variations in reel diameter, and means for energizing the field winding of said second generator in accordance with the product of said two potentials.

4. In a tension controller for a material winding system comprising, a motor driving a work roll and a motor driving a winding reel, the combination with interconnected speed adjusting means for the motors driving said work roll and said reel to effect coordinated speed adjustment of said motors and control means for said reel motor acting to maintain the material under constant tension during constant strip speed winding, of means providing a potential which varies in accordance with the rate of change of strip speed, means providing a potential which varies in accordance with variations in reel diameter, inertia compensating means including a generator having an armature and a field winding, means responsive to the last mentioned potential to drive said armature at a rate inverse with respect to reel diameter, means to energize said field winding in accordance with the product of the first mentioned potential and the inverse function of said last mentioned potential and means including a winding having connections with said generator armature and affording adjustment of said control means to compensate said control means for inertia effects on the material winding system.

5. In a tension controller for a material winding system comprising, a motor driving a work roll and a motor driving a winding reel, the combination with interconnected speed adjusting means for the motors driving said work roll and said reel to effect coordinated speed adjustment of said motors and control means for said reel motor to maintain the material under constant tension during constant strip speed winding, of means providing a potential which varies in accordance with the rate of change of strip speed, means providing a potential which varies in accordance with variations in reel diameter, inertia compensating means for said control means comprising first and second generators each of which has an armature and a field winding, means responsive to the last mentioned potential for driving the armature of said first generator at a rate inverse with respect to variations in reel diameter, means for energizing the field winding of said first generator with the product of the first mentioned potential and the inverse function of said last mentioned potential, means responsive to said last mentioned potential to drive the armature of said second generator at a rate in accordance with variations in reel diameter, and means for energizing the field winding of said second generator in accordance with the product of said two potentials, and means including a winding having connections with said generator armatures and affording adjustment of said control means to compensate said control means for inertia effects on the material winding system.

6. In a tension controller for a material winding system comprising, a motor driving a work roll and a motor driving a winding reel, the combination with interconnected speed adjusting for the motors driving said work roll and said reel to effect coordinated speed adjustment of said motors and control means for said reel motor to maintain the material under constant tension during constant strip speed winding, of means providing a potential which varies in accordance with the rate of change of strip speed, means providing a potential which varies in accordance with variations in reel diameter, inertia compensating means including a generator having an armature and a field winding, means responsive to the last mentioned potential to drive said armature at a rate inverse with respect to reel diameter, means to energize said field winding in accordance with the product of the first mentioned potential and the inverse function of the last mentioned potential means including a winding having connections with said generator armature to compensate said control means for inertia effects on the material winding system, and adjusting means in circuit with said last mentioned winding to afford selective adjustment of the energization of said winding to compensate for changes in strip material width.

7. In a tension controller for a material winding system comprising, a motor driving a work roll and a motor driving a winding reel, the combination with interconnected speed adjusting means for the motors driving said work roll and said reel to effect coordinated speed adjustment of said motors and control means for said reel motor to maintain the material under constant tension during constant strip speed winding, of means providing a potential which varies in accordance with the rate of change of strip speed, means providing a potential which varies in accordance with variations in reel diameter, inertia compensating means for said control means comprising first and second generators each of which has an armature and a field winding, means responsive to the last mentioned potential for driving the armature of said first generator at a rate inverse with respect to variations in reel diameter, means for energizing the field winding of said first generator with the product of the first mentioned potential and the inverse function of said last mentioned potential, means responsive to said last mentioned potential to drive the armature of said second generator at a rate in accordance with variations in reel diameter, and means for energizing the field winding of said second generator in accordance with the product of said two potentials, means including a winding having connections with said generator armatures to compensate said control means for inertia effects on the material winding system, and adjusting means having connections with said generator armatures to afford selective adjustment of the energization of said last mentioned winding to compensate for changes in strip material width.

8. In a tension controller for a material winding system comprising, a motor driving a work roll and a motor driving a winding reel, the combination with interconnected speed adjusting means for the motors driving said work roll and said reel to effect coordinated speed adjustment of said motors and control means for said reel motor to maintain the material under constant tension during constant strip speed winding, of a first generator driven in accordance with the speed of said strip material, second and third generators having field windings energizable by said first generator, a transformer interposed between said first generator and said second and third generators, fourth and fifth generators having field windings energizable by said second and third generators respectively, means for driving said second and fourth generators at a rate in accordance with variations in reel diameter and for rotating said third and fifth generators at a rate inverse with respect to variations in reel diameter, and a winding for said control means energizable by said fourth and fifth generators to compensate said control means for inertia effects on the material winding system.

9. In a tension controller for a material winding system comprising, a motor driving a work roll and a motor driving a winding reel, the combination with interconnected speed adjusting means associated with the motors driving said work roll and said reel to effect coordinated speed adjustment of said motors and control means for said reel motor to maintain the material under constant tension during constant strip speed winding, of a first generator driven in accordance with the speed of said strip material, second and third generators having field windings energizable by said first generator, a transformer interposed between said first generator and said second and third generators, fourth and fifth generators having field windings energizable by said second and third generators respectively, means for driving said second and fourth generators at a rate in accordance with variations in reel diameter and for rotating said third and fifth generators at a rate inverse with respect to variations in reel diameter, a winding for said control means and having connections with said fourth and fifth generators to compensate said control means for inertia effects on the material winding system, and adjusting means in said connections to afford selective adjustments of the energization of said last mentioned winding to compensate for changes in strip material width.

10. In a tension controller for a material winding system comprising, a motor driving a work roll and a motor driving a winding reel, the combination with interconnected speed adjusting means for the motors driving said work roll and said reel to effect coordinated speed adjustment of said motors and control means for said reel motor to maintain the material under constant tension during constant strip speed winding, of a first generator driven in accordance with the speed of said strip material, second and third generators having field windings energizable by said first generator, a transformer interposed between said first generator and said second and third generators, fourth and fifth generators having field windings energizable by said second and third generators respectively, means providing a potential which varies in accordance with variations in reel diameter, first and second motors having connections with said last mentioned means to drive said second and fourth generators at rates in accordance with variations in reel diameter and to drive said third and fifth generators at a rate inverse with respect to variation in reel diameter respectively, and a winding for said control means and energizable by said fourth and fifth generators to compensate said control means for inertia effects on the material winding system.

11. In a tension controller for a material winding system comprising, a motor driving a work roll and a motor driving a winding reel, the combination with interconnected speed adjusting means for the motors driving said work roll and said reel to effect coordinated speed adjustment of said motors and control means for said reel motor to maintain the material under constant tension during constant strip speed winding, of a first generator driven in accordance with the speed of said strip material, second and third generators having field windings energizable by said first generator, a transformer interposed between said first generator and said second and third generators, fourth and fifth generators having field windings energizable by said second and third generators respectively, means providing a potential which varies in accordance with variations in reel diameter, first and second motors having connections with said last mentioned means to drive said second and fourth generators at a rate in accordance with variations in reel diameter and to rotate said third and fifth generators at a rate inversely with respect to reel diameter respectively, a winding for said control means energizable by said fourth and fifth generators to compensate said control means for inertia effects on the material winding system, and an adjusting means in circuit with last mentioned winding to afford selective adjustment of the energization thereof to compensate for changes in strip material width.

12. In a tension control system for a material winder comprising a motor driving a work roll and a motor driving the winding reel, the combination with interconnected speed adjusting means for the motors driving said work roll and said reel to effect coordinated speed adjustment of said motors and control means for said reel motor to maintain the material under constant tension during constant strip speed winding, of a first generator driven in accordance with the speed of said strip material, second and third generators having field windings energizable by said first generator, a transformer interposed between said first generator and said second and third generators, fourth and fifth generators having field windings energizable by said second and third generators respectively, means providing a potential which varies in accordance with variations in reel diameter, first and second motors having connections with said last mentioned means to drive said second and fourth generators at a rate in accordance with variations in reel diameter and to drive said third and fifth generators at a rate inverse with respect to reel diameter respectively, and a winding for said control means and energizable by said fourth and fifth generators to compensate said control means for inertia effects on the material winder.

13. In a tension controller for a material winding system comprising, a motor driving a work roll and a motor driving a winding reel, the combination with interconnected speed adjusting means for the motors driving said work roll and said reel to effect coordinated speed adjustment of said motors and control means for said reel motor to maintain the material under constant tension during constant strip speed winding, of a first generator connected to said work roll motor for drive thereby, a transformer having a primary winding connected to said first generator and a secondary winding, amplifying means having an input side connected to said transformer secondary winding and having an output side, second and third generators having field windings connected to the output side of said amplifying means, fourth and fifth generators energizable by said second and third generators respectively, means providing a potential which varies in accordance with variations in reel diameter, first and second motors having armatures connected to said second and fourth generators and to said third and fifth generators respectively for drive of the same, said motors having separately energizable field windings, a source of electrical energy connected to the armature of said first motor and to the field winding of said second motor, said potential providing means being connected to the armature of said second motor and to the field winding of said first motor, and a winding for said control means simultaneously energizable by said fourth and fifth generators to compensate said control means for inertia effects on the material winding system.

References Cited in the file of this patent

UNITED STATES PATENTS

| | | |
|---|---|---|
| 2,366,148 | Montgomery | Dec. 26, 1944 |
| 2,462,233 | Stoltz | Feb. 22, 1949 |
| 2,523,085 | Allbert et al. | Sept. 19, 1950 |
| 2,550,104 | Allbert | Apr. 24, 1951 |
| 2,583,074 | Allbert et al. | Jan. 22, 1952 |
| 2,586,412 | Winchester | Feb. 19, 1952 |
| 2,688,111 | Jones | Aug. 31, 1954 |